US011891915B2

(12) United States Patent
Kilchyk

(10) Patent No.: US 11,891,915 B2
(45) Date of Patent: Feb. 6, 2024

(54) AUXILIARY TURBOMACHINERY WEIGHT REDUCTION USING INTERNAL ENGINEERED DESIGN

(71) Applicant: Hamilton Sundstrand Corporation, Charlotte, NC (US)

(72) Inventor: Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/726,954

(22) Filed: Apr. 22, 2022

(65) Prior Publication Data

US 2023/0340880 A1 Oct. 26, 2023

(51) Int. Cl.

*F01D 5/04* (2006.01)
*F01D 5/14* (2006.01)

(52) U.S. Cl.

CPC ............ *F01D 5/048* (2013.01); *F01D 5/147* (2013.01); *F05D 2240/301* (2013.01); *F05D 2240/80* (2013.01); *F05D 2250/18* (2013.01)

(58) Field of Classification Search

CPC ...... F04D 29/284; F04D 29/30; F04D 29/023; F04D 29/164; F04D 29/682; F04D 29/666; F04D 29/2277; F04D 29/2222; F04D 29/32; F04D 29/24; F04D 29/242; F04D 29/28; F04D 29/2216; F04D 29/2261; F04D 27/023; F04D 27/0238; F01D 5/048; F01D 5/147; F01D 5/046; F01D 5/18; F01D 5/28; F01D 5/34; F01D 9/045; F01D 5/02; F01D 5/04; F01D 5/043; F01D 5/087; F01D 5/085; F01D 25/005; F01D 25/12; F01D 5/082; F01D 5/16; F01D 5/14; F01D 5/12;

(Continued)

(56) References Cited

U.S. PATENT DOCUMENTS 7,431,563 B2 * 10/2008 Kraemer .............. F04D 29/023
416/229 A
9,903,207 B2 2/2018 Tozzi et al.

(Continued)

FOREIGN PATENT DOCUMENTS

DE 102016217349 A1 3/2018
EP 2841700 A1 3/2015

(Continued)

OTHER PUBLICATIONS

Machine Translation of EP 3364040A [retrieved on Jun. 8, 2023]. Retrieved from: Espacenet. (Year: 2023).*

(Continued)

*Primary Examiner* — Eric J Zamora Alvarez
(74) *Attorney, Agent, or Firm* — Kinney & Lange, P.A.

(57) ABSTRACT

A rotor for a rotary machine includes a hub centered on a central axis, the hub comprising a shaft portion extending along the central axis, a disk portion circumferentially disposed about the shaft portion, a platform portion as a radially outermost extent of the shaft portion and the disk portion, and a branched support structure extending radially inward from the platform portion. The rotor further includes a plurality of blades extending outward from the platform portion of the hub. The branched support structure comprises a hub region and a blade support region associated with one blade of the plurality of blades.

18 Claims, 4 Drawing Sheets

(58) Field of Classification Search
CPC ................. F01D 5/088; F05D 2230/31; F05D 2240/301; F05D 2240/303; F05D 2250/51; F05D 2250/291; F05D 2210/42; F05D 2250/52; F05D 2250/70; F05D 2300/514; F05D 2300/608; B33Y 80/00; F02K 5/00
See application file for complete search history.

(56) References Cited

U.S. PATENT DOCUMENTS

| | | | |
|---|---|---|---|
| 10,927,676 | B2 | 2/2021 | Ho et al. |
| 10,982,672 | B2 | 4/2021 | Scancarello et al. |
| 11,130,174 | B2 | 9/2021 | Notarnicola et al. |
| 11,167,351 | B2 | 11/2021 | Paniogue et al. |
| 2006/0140767 | A1 | 6/2006 | Garman et al. |
| 2017/0107821 | A1 | 4/2017 | Schwarz |

FOREIGN PATENT DOCUMENTS

| | | | |
|---|---|---|---|
| EP | 3156591 | A1 | 4/2017 |
| EP | 3364040 | A1 | 8/2018 |
| JP | 2019138443 | A | 8/2019 |
| JP | 2019138444 | A | 8/2019 |
| WO | 2020136473 | A1 | 7/2020 |

OTHER PUBLICATIONS

Extended European Search Report for EP Application No. 23168576.9, dated Sep. 15, 2023, 8 pages.

* cited by examiner

AUXILIARY TURBOMACHINERY WEIGHT REDUCTION USING INTERNAL ENGINEERED DESIGN

BACKGROUND

This application relates to aircraft auxiliary turbomachinery and, more particularly, to reduced-weight components for a cabin air compressor.

Cabin air compressors are used in environmental control systems in aircraft to condition air for delivery to an aircraft cabin. Conditioned air is air at a temperature, pressure, and humidity desirable for aircraft passenger comfort and safety. At or near ground level, the ambient air temperature and humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from the air by the air cycle machine before the air is delivered to the aircraft cabin.

A cabin air compressor can be used to compress air for use in an environmental control system. The cabin air compressor includes a motor to drive a compressor section that in turn compresses air flowing through the cabin air compressor. This compressor section includes a rotor, which transfers rotational energy from the motor to a fluid. The rotor is surrounded by a rotor shroud which improves rotor efficiency and protects the surrounding components in case of rotor failure.

SUMMARY

A rotor for a rotary machine includes a hub centered on a central axis, the hub comprising a shaft portion extending along the central axis, a disk portion circumferentially disposed about the shaft portion, a platform portion as a radially outermost extent of the shaft portion and the disk portion, and a branched support structure extending radially inward from the platform portion. The rotor further includes a plurality of blades extending outward from the platform portion of the hub. The branched support structure comprises a hub region and a blade support region associated with one blade of the plurality of blades.

A rotary machine includes a tie rod and a rotor mounted on the tie rod. The rotor includes a hub centered on a central axis, the hub comprising a shaft portion extending along the central axis, a disk portion circumferentially disposed about the shaft portion, a platform portion as a radially outermost extent of the shaft portion and the disk portion, and a branched support structure extending radially inward from the platform portion. The rotor further includes a plurality of blades extending outward from the platform portion of the hub. The branched support structure comprises a hub region and a blade support region associated with one blade of the plurality of blades.

Figure 1:
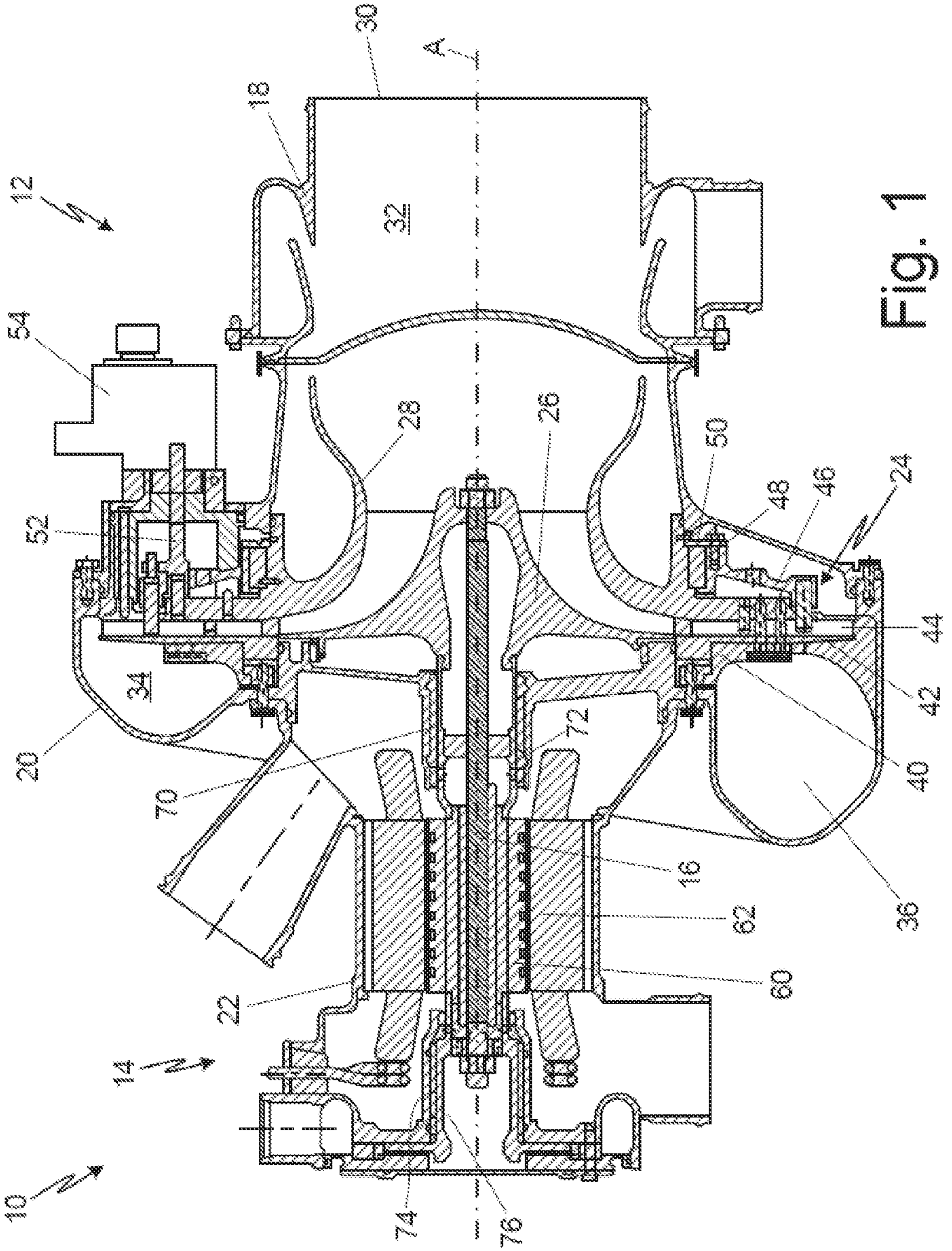
FIG. 1 is cross-sectional view of a cabin air compressor.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a cross-sectional view of cabin air compressor 10. Cabin air compressor 10 includes compressor section 12, motor section 14, tie rod 16, compressor inlet housing 18, compressor outlet housing 20, motor housing 22, variable diffuser 24, rotor 26, and rotor shroud 28. Compressor inlet housing 18 includes inlet 30 and inlet duct 32. Compressor outlet housing 20 includes outlet duct 34 and outlet 36. Variable diffuser 24 includes backing plate 40, inboard plate 42, diffuser vanes 44, drive ring 46, drive ring bearing 48, backup ring 50, pinion 52, and variable diffuser actuator 54. Motor section 14 includes motor rotor 60 and motor stator 62. Cabin air compressor 10 further includes first journal bearing 70, first rotating shaft 72, second journal bearing 74, and second rotating shaft 76. FIG. 1 also shows axis A.

Cabin air compressor 10 includes compressor section 12 and motor section 14 mounted on tie rod 16. Tie rod 16 is configured to rotate about axis A. Compressor section 12 includes compressor inlet housing 18 and compressor outlet housing 20 that are connected to one another. Motor section 14 includes motor housing 22, which is connected to compressor outlet housing 20. Variable diffuser 24 is positioned between compressor inlet housing 18 and compressor outlet housing 20. Rotor 26 is positioned between compressor inlet housing 18 and compressor outlet housing 20. Rotor 26 is mounted on tie rod 16, which rotatably connects rotor 26 and motor section 14. Rotor shroud 28 is positioned radially outward from and partially surrounds compressor rotor 26.

Compressor inlet housing 18 includes inlet 30 and inlet duct 32. Inlet 30 is positioned at a first end of compressor inlet housing 18. Inlet duct 32 extends from inlet 30 through compressor inlet housing 18 to rotor 26. Compressor outlet housing 20 includes outlet duct 34 and outlet 36. Outlet duct 34 extends through compressor outlet housing 20 from rotor 26 to outlet 36.

Variable diffuser 24 includes backing plate 40, inboard plate 42, diffuser vanes 44, drive ring 46, drive ring bearing 48, pinion 50, backup ring 52, and variable diffuser actuator 54. Backing plate 40 abuts compressor outlet housing 20 on a first side and inboard plate 42 on a second side. Inboard plate 42 abuts backing plate 40 on a first side and diffuser vanes 44 on a second side. Diffuser vanes 44 abut inboard plate 42 on a first side and rotor shroud 28 on a second side. Diffuser vanes 44 are configured to direct the compressed air from rotor 26 into outlet duct 34. Drive ring 46 is positioned radially outward from rotor shroud 28, and drive ring bearing 48 is positioned between driver ring 46 and rotor shroud 28. Drive ring 46 abuts rotor shroud 28 on a first side and backup ring 50 on a second side. Backup ring 50 is positioned radially outward of rotor shroud 28. Pinion 52 is connected to variable diffuser actuator 54 and is coupled to drive ring 46. Pinion 52 permits control of variable diffuser 24. Drive ring 46 is coupled to diffuser vanes 44 with pins, and as drive ring 46 is rotated it will drag diffuser vanes 44 and cause them to rotate.

Motor section 14 includes motor housing 22, motor rotor 60, and motor stator 62. Motor housing 22 surrounds motor rotor 60 and motor stator 62. Motor rotor 60 is disposed within motor stator 62 and is configured to rotate about axis A. Motor rotor 60 is mounted to tie rod 16 to drive rotation of tie rod 16.

Motor rotor 60 of motor section 14 drives rotation of shafts in cabin air compressor 10, which in turn rotate rotor 26. The rotation of rotor 26 draws air into inlet 30 of compressor inlet housing 18. The air flows through inlet duct 32 to rotor 26 and will be compressed by rotor 26. The compressed air is then routed through variable diffuser 24 and into outlet duct 34 of compressor outlet housing 20. The air then exits cabin air compressor 10 through outlet 36 of compressor outlet housing 20 and can be routed to another component of an environmental control system, such as an air cycle machine.

Cabin air compressor 10 further includes first journal bearing 70, first rotating shaft 72, second journal bearing 74, and second rotating shaft 76. First journal bearing 70 is positioned in compressor section 12 and is supported by compressor outlet housing 20. First rotating shaft 72 extends between and rotates with rotor 26 and motor rotor 60. Motor rotor 60 drives rotation of rotor 26 with first rotating shaft 72. A radially outer surface of first rotating shaft 72 abuts a radially inner surface of first journal bearing 70. Second journal bearing 74 is positioned in motor section 14 and is supported by motor housing 22. Second rotating shaft 76 extends from and rotates with motor rotor 60. A radially outer surface of second rotating shaft 76 abuts a radially inner surface of second journal bearing 74.

Figure 2:
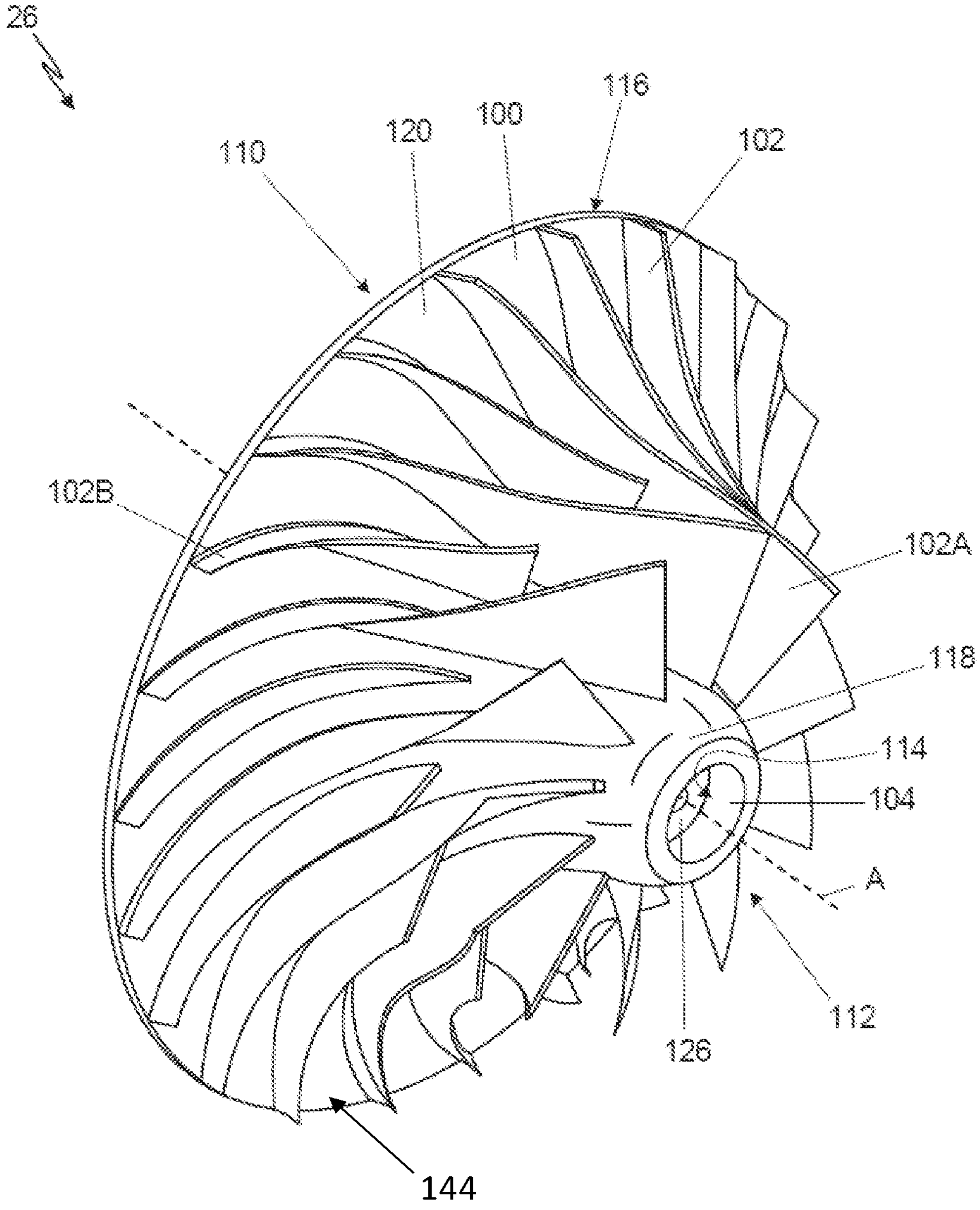
FIG. 2 is a perspective view of a bladed side of the rotor of the cabin air compressor.
Figure 3:
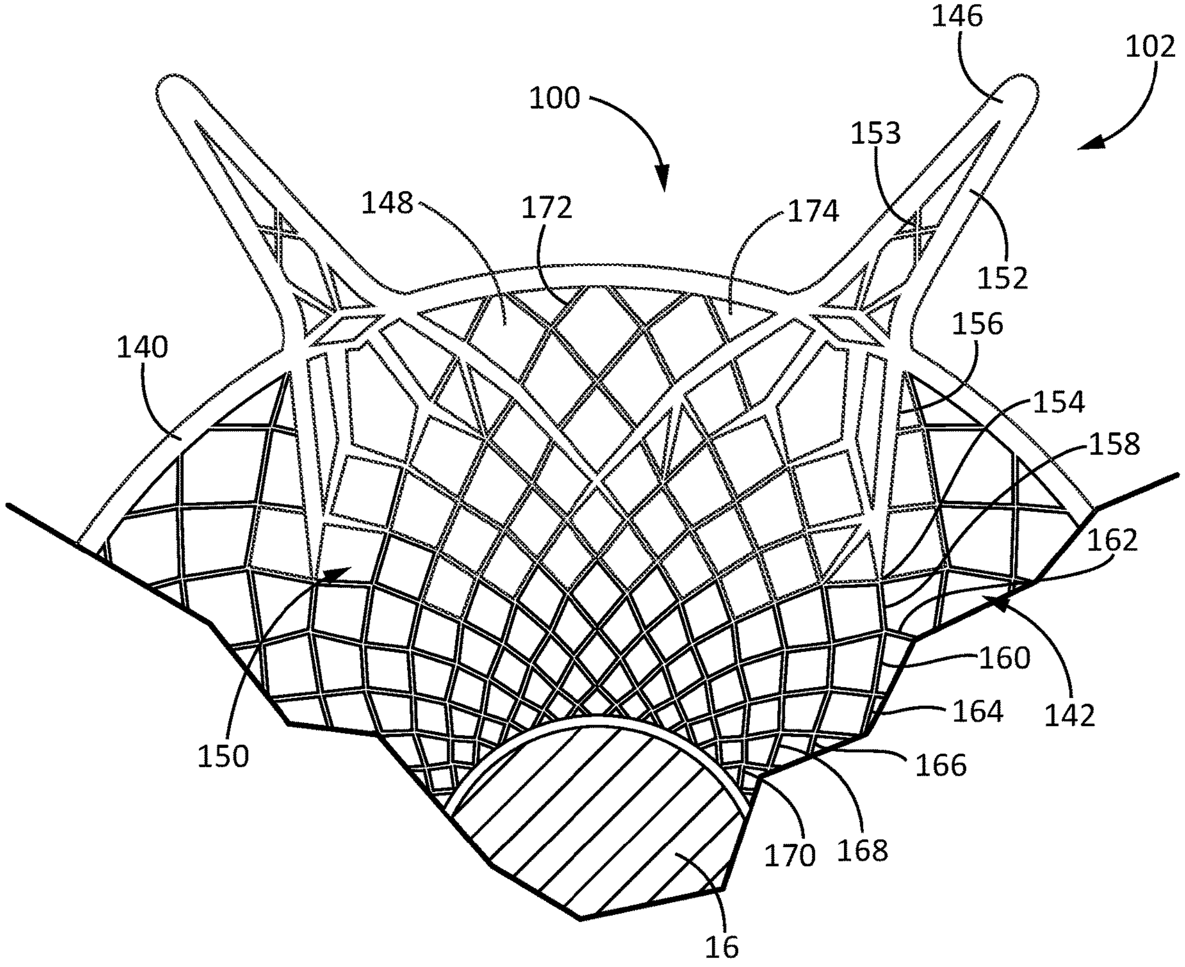
FIG. 3 is a schematic cross-sectional view of the rotor of FIG. 2, illustrating an internal branching structure.

FIG. 2 is a perspective view of a bladed side of rotor 26 of cabin air compressor 10. FIG. 3 is a cross-sectional view of rotor 26 taken axially along hub 100 and along a centerline of blade 102. FIGS. 2 and 3 will be discussed together. Rotor 26 includes hub 100, blades 102 (including long blades 102A and short blades 102B), and bore 104. Hub 100 includes non-bladed side 110, bladed side 112, radially inner end 114, radially outer end 116, shaft portion 118, disk portion 120, flange 126. As shown in FIG. 3, rotor 26 further includes exterior surface 140 and branched support structure 142, discussed in greater detail below.

Rotor 26 includes hub 100 and blades 102 attached to and extending outward from an outer extent (i.e., platform portion 144) of hub 100. Blades 102 include long blades 102A and short blades 102B. Bore 104 extends through a center of hub 100 and a tie rod of a rotary machine can extend through bore 104. Hub 100 has non-bladed side 110 and bladed side 112 opposite of non-bladed side 110. Hub 100 also has radially inner end 114 and radially outer end 116 opposite of radially inner end 114. Radially inner end 114 defines bore 104 extending through hub 100 of rotor 26.

Hub 100 has shaft portion 118 that extends axially from non-bladed side 110 to bladed side 112 of hub 100 along axis A. Disk portion 120 extends radially outwards from shaft portion 118 toward radially outer end 116 of hub 100 near non-bladed side 110 of hub 100. Hub 100 further includes flange 126 positioned on shaft portion 118 near bladed side 112 of hub 100 and extends radially inward from shaft portion 118 of hub 100.

Blades 102 are positioned on hub 100 and extend radially and axially outward from a blade position of hub 100. Blades 102 include long blades 102A that extend along disk portion 120 and shaft portion 118 of hub 100 from radially outer end 116 to bladed side 112 of hub 100. Blades 102 also include short blades 102B that extend along disk portion 120 from radially outer end 116 to a point about midway between non-bladed side 110 and bladed side 112 of hub 100.

Hub 100 and blades 102 further include exterior surface 140 that surrounds branched support structure 142 in an interior of hub 100 and blades 102. Exterior surface 140 can be a solid, continuous surface. In an exemplary embodiment, branched support structure 142 can be a combination of hub region(s) 148 and blade support region(s) 150. FIG. 3 is a simplified partial cross-sectional view of rotor 26 along a plane transverse to axis A, showing an exemplary branched support structure 142. In the embodiment shown, hub region 148 is disposed between adjacent blade support regions 150 and includes a rhombus-like branching geometry. As used herein, the term “rhombus-like” can refer to any generally rhomboid or rhombus shape. Blade support regions 150 can follow a fractal branching pattern, that is, with sequential stages of two “child” branches extending from a “parent” branch. A child branch can have a reduced cross-sectional thickness compared to its parent. In an alternative embodiment, the branching pattern can deviate from a strict fractal design and have more than two child branches extending from a respective parent and/or a parent and child with similar cross-sectional thicknesses.

As shown in FIG. 3, blades 102 can have solid tips 146 and outer walls 152. As shown, there can be blade support branches 153 extending between outer walls 152 and/or into hub 100. In alternative embodiments, blades 102 can be completely hollow or completely solid. Transitioning from blade 102 to hub 100, a first branching stage 154 extends from each primary branch 156 and generally demarcates the transition into a pair of secondary branches 158. In this manner, any primary branch 156 can be considered a trunk. Some primary branches 156 can be extensions of outer walls 152 of blades 102. Each secondary branch 158 is a child of its parent, primary branch 156. A pair of tertiary branches 160 extends from a secondary branch 158 at a second branching stage 162. Each tertiary branch 160 is a child of its parent, secondary branch 158. Additional (i.e., quaternary 164, quinary 166, senary 168, septenary 170, etc.) successive branching stages following this pattern are also shown. The direction of the branching is generally inward from a respective blade 102 toward tie rod 16 such that the $n^{th}$ branch from a particular primary branch (trunk) 156 is closer to tie rod 16 than earlier branches. Hub region 148 includes branches 172 forming a rhombus-like branching network. Various branches 172 can merge with the primary branches 156 and/or various child branches (e.g., secondary branches 158, tertiary branches 160, etc.) of blade support region 150. Similarly, various primary branches 156 and/or child branches of adjacent blade support regions 150 can merge with one another and/or branches 172. It should be noted that later branching stages of blade support region 150 can form rhombus-like shapes as well. In an alternative embodiment, hub regions 148 and blade support regions can have substantially similar fractal, rhomboid, or other geometric branching patterns.

Material-free voids 174 exist between the various branches, as well as within blades 102. As such, the overall weight of rotor 26 can be reduced compared to traditional rotors, and the strategic placement of branches and other solid material can give rotor 26 a strength equivalent to traditional rotors. For example, blades 102 can have solid tips 146, as tips 146 can experience higher deflection during operation of rotor 26. Additionally, rotor 26 can experience relatively higher stresses at the roots of blades 102, so the branching of outer walls 152 allows for diffusion of these stresses into hub 100.

The incorporation of branched support structure 142 imparts favorable mechanical properties to rotor 26, such as stress, strain, and stiffness can be optimized to improve the performance of rotor 26 by reducing stress in high stress regions of rotor 26 and reducing strain and increasing stiffness in deflection regions of rotor 26. Reducing stress and strain in local regions of rotor 26 can also reduce stress and strain in rotor 26 generally. Reducing the stresses in high stress regions can reduce the failure rate of rotor 26 and, thus, the failure rate of cabin air compressor 10. Reduced failure rates result in reduced down time, reduced repairs, and reduced costs. Reducing the strain and increasing the stiffness in deflection regions can reduce the tolerances between blades 102 of rotor 26 and rotor shroud 28. Reducing the tolerances between blades 102 of rotor 26 and rotor shroud 28 increases the compression efficiency of cabin air compressor 10, as more air is forced through rotor 26 and into variable diffuser 24. Reducing stress in stress regions of rotor 26 will also improve the longevity of rotor 26. Reducing the stresses at stress regions can reduce the failure rate of rotor 26 as well as the failure rate of cabin air compressor 10 overall. During operation, these failures can be damage components surrounding rotor 26, such as rotor shroud 28, as these components are required to contain the energy of the failure for safety of the aircraft and its passengers. Reduced failure rates result in reduced down time, reduced repairs, and reduced costs.

Rotor 26 is one example of a rotor in which branched support structure 142 can be used. In alternate embodiments, branched support structure 142 can be used in any suitable rotor, for example a turbine rotor, having any design. It is also possible to include such a branched support structure in stator 62. Further, cabin air compressor 10 is one example of a turbomachinery or rotary machine in which rotor 26 or any other rotor with branched support structure 142 can be used. In alternate embodiments, rotor 26 or any other rotor with branched support structure 142 can be used in an air cycle machine or any other rotary machine.

Figure 4:
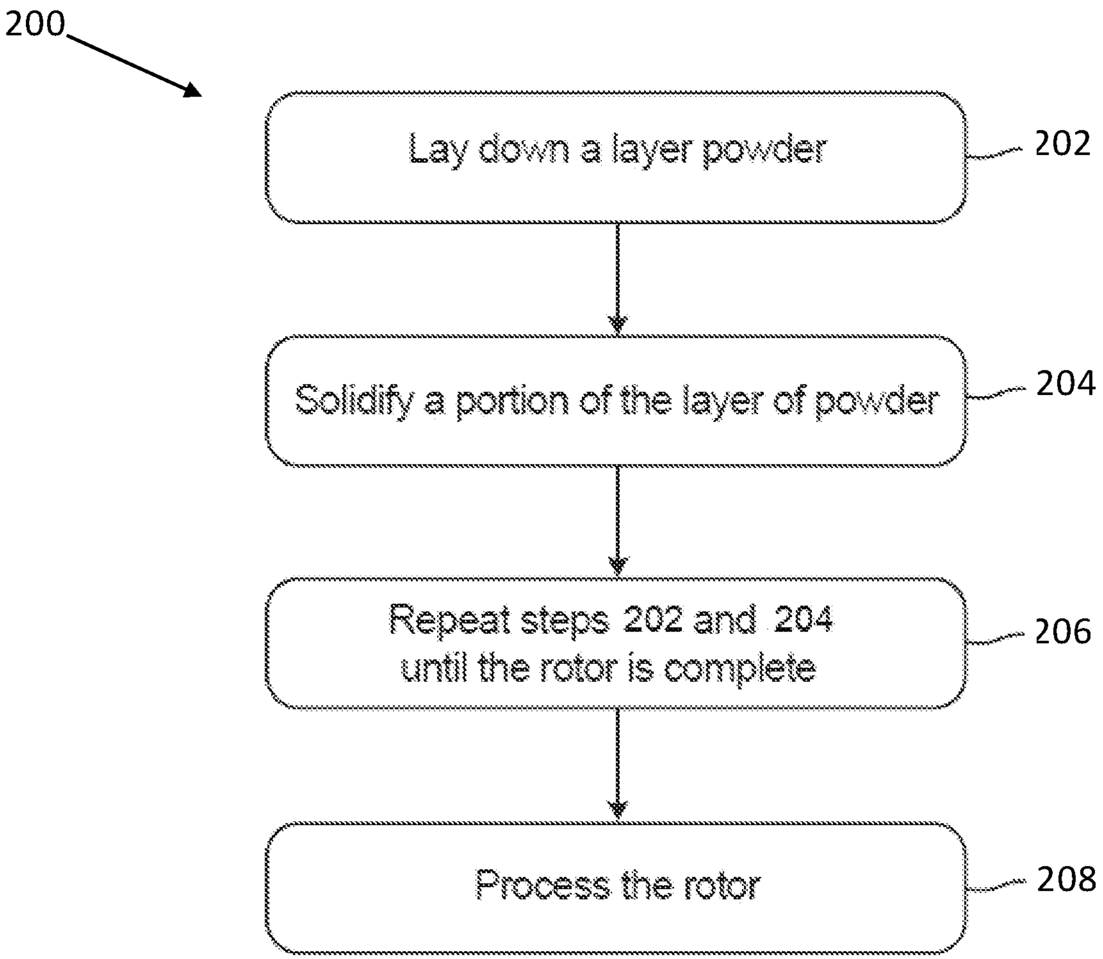
FIG. 4 is a flowchart illustrating a method of manufacturing the rotor of FIGS. 2 and 3.

FIG. 4 is a flowchart showing steps 202-208 of method 200 for manufacturing any disclosed embodiment of rotor 26. Step 202 includes laying down a layer of powder. Step 204 solidifying a portion of the layer of powder. Step 206 includes repeating steps 202 and 204 until rotor 26 is completed. Step 208 includes processing rotor 26.

Rotor 26 can be manufactured using an additive manufacturing process. Additive manufacturing involves manufacturing rotor 26 layer by layer. Additive manufacturing processes allow complex internal and external shapes and geometries to be manufactured that are not feasible or possible with traditional manufacturing. A typical additive manufacturing process involves using a computer to create a three-dimensional representation of rotor 26. The three-dimensional representation will be converted into instructions which divide rotor 26 into many individual layers. These instructions are then sent to an additive manufacturing device. This additive manufacturing device will print each layer, in order, and one at a time until all layers have been printed. Any additive manufacturing process can be used, including direct metal laser sintering, electron beam freeform fabrication, electron-beam melting, selective laser melting, selective laser sintering, or other equivalents that are known in the art.

Step 202 includes laying down a layer of powder. The powder can be made of a material selected from the group consisting of stainless steel, corrosion-resistant steel, nickel-chromium alloy, titanium, aluminum, synthetic fiber, fiberglass, composites, and combinations thereof. This powder may be laid down by a roller, pressurized gas, or other equivalents that are known in the art. This powder may have any grain size, wherein the grain size of the powder affects the unprocessed surface properties of rotor 26.

Step 204 includes solidifying a portion of the layer of powder. A portion of the layer of powder can be solidified by applying energy to layer of powder. Any energy source can be used, including laser beam, electron beams, or other equivalents that are known in the art. The application of this energy will solidify the powder in a specific configuration. The specific configuration of solidified metal will be entirely dependent on which layer the process is currently at. This specific configuration will be in a specific shape and distribution so that when combined with the other layers, it forms rotor 26.

Step 206 includes repeating steps 202 and 204 until rotor 26 is completed. These two steps together lead to rotor 26 being built layer by layer to completion. The specific configuration of step 204 consists of exterior surface 140, which is continuous and solid, and branched support structure 142 which includes various branching stages. The thickness, direction, and/or number of branches can be locally optimized to reduce stress or strain in specific regions. Reducing the stresses at high stress regions can reduce the failure rate of rotor 26 and thus the failure rate of cabin air compressor 10. Reduced failure rates result in reduced down time, reduced repairs, and reduced costs. Reduced strain, and thus reduced deflection, at deflection regions means that the parts deform less when in operation. If hub 100 and blades 102 undergo less deflection, the tolerances between components of cabin air compressor 10 can be reduced. Reducing tolerances between components increases the efficiency of cabin air compressor 10.

Step 208 is an optional rotor processing step. Processing rotor 26 can include post processing steps, such as smoothing of exterior surface 140 of rotor 26 or removal of powder from an interior of rotor 26. Since an additive manufacturing process is used, exterior surface 140 of rotor 26 may be rougher than desired. Through sanding, brushing, buffing, grinding, and combinations thereof, exterior surface 140 of rotor 26 may be made smoother. Removal of the powder from an interior of rotor 26 can involve the process of removing the unsolidified powder from voids 174 of branched support structure 142 through high pressure gas, mechanical movements, or other methods known in the art.

Discussion of Possible Embodiments

The following are non-exclusive descriptions of possible embodiments of the present invention.

A rotor for a rotary machine includes a hub centered on a central axis, the hub comprising a shaft portion extending along the central axis, a disk portion circumferentially disposed about the shaft portion, a platform portion as a radially outermost extent of the shaft portion and the disk portion, and a branched support structure extending radially inward from the platform portion. The rotor further includes a plurality of blades extending outward from the platform portion of the hub. The branched support structure comprises a hub region and a blade support region associated with one blade of the plurality of blades.

The rotor of the preceding paragraph can optionally include, additionally and/or alternatively, any one or more of the following features, configurations and/or additional components:

In the above rotor, the blade support region can include a plurality of branching sections, each branching section having a primary branch disposed in a radially outermost location, and a plurality of secondary branches diverging from the primary branch at a first branching region and extending radially inwardly therefrom.

In any of the above rotors, each of the plurality of blades can extend from the platform portion at blade locations, and the primary branches of at least a subset of the plurality of branching sections can be circumferentially situated at the blade locations.

In any of the above rotors, the primary branch of the blade support region can include an extension of an outer wall of the one blade of the plurality of blades.

In any of the above rotors, at least one branching section of the plurality of branching section can further include at least one second branching region disposed between one secondary branch of the plurality of secondary branches and a plurality of tertiary branches.

In any of the above rotors, each primary branch can have a first thickness, each secondary branch of the plurality of secondary branches can have a second thickness, and each tertiary branch of the plurality of tertiary branches can have a third thickness.

In any of the above rotors, the first thickness can be greater than the second thickness, and the second thickness can be greater than the third thickness.

In any of the above rotors, secondary or tertiary branches of at least a subset of the plurality of branching sections can intersect and join with secondary or tertiary branches of others of the plurality of branching sections.

In any of the above rotors, the hub region can include a plurality of branches forming a rhombus-like pattern.

In any of the above rotors, a subset of the plurality of branches of the hub region can intersect and join with primary, secondary, or tertiary branches of an adjacent blade support region.

A rotary machine includes a tie rod and a rotor mounted on the tie rod. The rotor includes a hub centered on a central axis, the hub comprising a shaft portion extending along the central axis, a disk portion circumferentially disposed about the shaft portion, a platform portion as a radially outermost extent of the shaft portion and the disk portion, and a branched support structure extending radially inward from the platform portion. The rotor further includes a plurality of blades extending outward from the platform portion of the hub. The branched support structure comprises a hub region and a blade support region associated with one blade of the plurality of blades.

The rotary machine of the preceding paragraph can optionally include, additionally and/or alternatively, any one or more of the following features, configurations and/or additional components:

In the above rotary machine, the blade support region can include a plurality of branching sections, each branching section having a primary branch disposed in a radially outermost location, and a plurality of secondary branches diverging from the primary branch at a first branching region and extending radially inwardly therefrom.

In any of the above rotary machines, each of the plurality of blades can extend from the platform portion at blade locations, and the primary branches of at least a subset of the plurality of branching sections can be circumferentially situated at the blade locations.

In any of the above rotary machines, the primary branch of the blade support region can include an extension of an outer wall of the one blade of the plurality of blades.

In any of the above rotary machines, at least one branching section of the plurality of branching section can further include at least one second branching region disposed between one secondary branch of the plurality of secondary branches and a plurality of tertiary branches.

In any of the above rotary machines, each primary branch can have a first thickness, each secondary branch of the plurality of secondary branches can have a second thickness, and each tertiary branch of the plurality of tertiary branches can have a third thickness.

In any of the above rotary machines, the first thickness can be greater than the second thickness, and the second thickness can be greater than the third thickness.

In any of the above rotary machines, secondary or tertiary branches of at least a subset of the plurality of branching sections can intersect and join with secondary or tertiary branches of others of the plurality of branching sections.

In any of the above rotary machines, the hub region can include a plurality of branches forming a rhombus-like pattern.

In any of the above rotary machines, a subset of the plurality of branches of the hub region can intersect and join with primary, secondary, or tertiary branches of an adjacent blade support region.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotor for a rotary machine comprising:
- a hub centered on a central axis, the hub comprising:
  - a shaft portion extending along the central axis;
  - a disk portion circumferentially disposed about the shaft portion;
  - a platform portion as a radially outermost extent of the shaft portion and the disk portion; and
  - a branched support structure extending radially inward from the platform portion; and
- a plurality of blades extending outward from the platform portion of the hub;
- wherein the branched support structure comprises a hub region and a blade support region associated with one blade of the plurality of blades;
- wherein the blade support region comprises a plurality of branching sections, each branching section comprising:
  - a primary branch disposed in a radially outermost location; and
  - a plurality of secondary branches diverging from the primary branch at a first branching region and extending radially inwardly therefrom;
  - wherein for each branching section, the primary branch has a first thickness greater than a second thickness of each of the secondary branches.

2. The rotor of claim 1, wherein each of the plurality of blades extends from the platform portion at blade locations, and wherein primary branches of at least a subset of the plurality of branching sections are circumferentially situated at the blade locations.

3. The rotor of claim 2, wherein each primary branch of the blade support region comprises an extension of an outer wall of the one blade of the plurality of blades.

4. The rotor of claim 2, wherein at least one branching section of the plurality of branching sections further comprises: a plurality of tertiary branches diverging from each of the plurality of secondary branches at a second branching region and extending radially inwardly therefrom.

5. The rotor of claim 4, wherein each tertiary branch of the plurality of tertiary branches has a third thickness.

6. The rotor of claim 5, wherein the second thickness is greater than the third thickness.

7. The rotor of claim 6, wherein secondary or tertiary branches of the subset of the plurality of branching sections intersect and join with secondary or tertiary branches of branching sections of an adjacent blade support region.

8. The rotor of claim 4, wherein the hub region comprises a plurality of branches forming a rhombus-like pattern.

9. The rotor of claim 8, wherein a subset of the plurality of branches of the hub region intersects and joins with primary, secondary, or tertiary branches of an adjacent blade support region.

10. A rotary machine comprising:

a tie rod extending through the rotary machine; and a rotor mounted on the tie rod, wherein the rotor comprises:

a hub centered on a central axis, the hub comprising:

a shaft portion extending along the central axis;

a disk portion circumferentially disposed about the shaft portion;

a platform portion as a radially outermost extent of the shaft portion and the disk portion; and a branched support structure extending radially inward from the platform portion; and a plurality of blades extending outward from the platform portion of the hub;

wherein the branched support structure comprises a hub region and a blade support region associated with one blade of the plurality of blades;

wherein the blade support region comprises a plurality of branching sections, each branching section comprising:

a primary branch disposed in a radially outermost location; and a plurality of secondary branches diverging from the primary branch at a first branching region and extending radially inwardly therefrom;

wherein for each branching section, the primary branch has a first thickness greater than a second thickness of each of the secondary branches.

11. The rotor of claim 10, wherein each of the plurality of blades extends from the platform portion at blade locations, and wherein primary branches of at least a subset of the plurality of branching sections are circumferentially situated at the blade locations.

12. The rotor of claim 11, wherein each primary branch of the blade support region comprises an extension of an outer wall of the one blade of the plurality of blades.

13. The rotor of claim 2, wherein at least one branching section of the plurality of branching sections further comprises: a plurality of tertiary branches diverging from each of the plurality of secondary branches at a second branching region and extending radially inwardly therefrom.

14. The rotor of claim 13, wherein each tertiary branch of the plurality of tertiary branches has a third thickness.

15. The rotor of claim 14, wherein the second thickness is greater than the third thickness.

16. The rotor of claim 15, wherein secondary or tertiary branches of the subset of the plurality of branching sections intersect and join with secondary or tertiary branches of branching sections of an adjacent blade support region.

17. The rotary machine of claim 13, wherein the hub region comprises a plurality of branches forming a rhombus-like pattern.

18. The rotary machine of claim 17, wherein a subset of the plurality of branches of the hub region intersects and joins with primary, secondary, or tertiary branches of an adjacent blade support region.

* * * * *